June 4, 1968 B. K. BETZ 3,387,261
CIRCUIT ARRANGEMENT FOR DETECTION AND CORRECTION OF ERRORS OCCURRING IN THE TRANSMISSION OF DIGITAL DATA
Filed Feb. 5, 1965 5 Sheets-Sheet 1

| | 14 | 13 | 12 | 11 | 10 | 9 | 8 | 7 | 6 | 5 | 4 | 3 | 2 | 1 |
|---|---|---|---|---|---|---|---|---|---|---|---|---|---|---|
| D | 0 | 1 | 1 | 1 | 1 | 1 | 1 | 1 | 0 | 0 | 0 | 1 | 1 | 1 |
| C | 1 | 1 | 0 | 1 | 0 | 0 | 1 | 0 | 0 | 0 | 1 | 1 | 1 | 0 |
| B | 1 | 1 | 1 | 0 | 1 | 0 | (1) | 1 | 1 | 0 | 1 | 1 | 0 | 0 |
| A | 1 | 1 | 0 | 1 | 1 | 0 | 0 | 0 | 1 | 1 | 0 | 1 | 1 | 1 |
| P | 0 | 0 | 1 | 0 | 0 | 0 | 0 | 0 | 0 | 1 | 1 | 0 | 1 | 0 |
| Q | 1 | 0 | 1 | 1 | 1 | 1 | 1 | 0 | 0 | 0 | 1 | 0 | 0 | 0 |

INVENTOR.
BERNARD KEITH BETZ
BY Robert S. Zein
ATTORNEY

INVENTOR.
BERNARD KEITH BETZ
BY Robert J. Zinn
ATTORNEY

June 4, 1968 B. K. BETZ 3,387,261

CIRCUIT ARRANGEMENT FOR DETECTION AND CORRECTION OF ERRORS OCCURRING IN THE TRANSMISSION OF DIGITAL DATA

Filed Feb. 5, 1965 5 Sheets-Sheet 3

INVENTOR.
BERNARD KEITH BETZ
BY Robert J. Zuin
ATTORNEY

INVENTOR.
BERNARD KEITH BETZ
BY Robert S. Linn
ATTORNEY

June 4, 1968 B. K. BETZ 3,387,261

CIRCUIT ARRANGEMENT FOR DETECTION AND CORRECTION OF ERRORS OCCURRING IN THE TRANSMISSION OF DIGITAL DATA

Filed Feb. 5, 1965 5 Sheets-Sheet 5

INVENTOR.
BERNARD KEITH BETZ

BY Robert J. Zinn
ATTORNEY

United States Patent Office 3,387,261

Patented June 4, 1968

3,387,261

CIRCUIT ARRANGEMENT FOR DETECTION AND CORRECTION OF ERRORS OCCURRING IN THE TRANSMISSION OF DIGITAL DATA

Bernard Keith Betz, Minneapolis, Minn., assignor to Honeywell Inc., a corporation of Delaware Filed Feb. 5, 1965, Ser. No. 430,704
14 Claims. (Cl. 340—146.1)

ABSTRACT OF THE DISCLOSURE

An apparatus for detecting errors in data being simultaneously processed through a plurality of information transfer channels and for effecting the correction of errors detected therein in an "on-the-fly" manner. Said apparatus including a pair of transfer registers for storing redundancy information related to said data information being transferred in both a parallel and a diagonal sense.

The present invention relates to a new and improved method and apparatus for effecting the detection and correction of errors occurring during the manipulation of digital information or data. More specifically, the present invention is concerned with a new and improved method and apparatus for manipulating digital information or data and effecting, on a continuous basis, any necessary corrections thereto.

It has long been known to use redundancy information in a data processing apparatus for detecting when data being manipulated therein is in error. An example of such a scheme for checking when an error is made in a data manipulating circuit is disclosed in the patent issued to Richard M. Bloch on Apr. 7, 1953, bearing U.S. Patent No. 2,634,052, which subsequently reissued as Patent No. 24,447, entitled, "Diagnostic Information Monitoring System."

The most commonly employed of these redundancy techniques is that referred to as the parity check. The parity checking technique is used with a binary representation wherein "N" binary digits form a unit of information. Associated with each unit of information is a parity bit which may be generated so as to make the addition Modulo 2 (half add without carry) of the binary bits comprising the unit of information either even or odd, i.e. 0 or 1, in accordance with whether even or odd parity is employed. In utilizing this technique for error checking purposes, the unit of information being readied for transmission is first summed Modulo 2 and the necessary parity bit generated whereafter the information and its associated parity bit are transmitted. Subsequently a new parity bit is generated for the unit of information and accompanying check bit thereby providing, upon comparison of the new and old parity bits, an immediate indication of any odd number of errors which might have occurred during the transmission. In practice, the unit of information may be conveniently chosen to correspond with the operative character of information if the format of the system is character-oriented, or with a word if the system is word-oriented.

In most data processing systems, the checking of the information for errors occurring during the manipulation thereof is a continuous process. As an instance, the information being readied for transfer from a main memory to a secondary storage device such as a magnetic tape unit may have its data format reoriented from a word, or a character, to that of a frame. Prior to storing the information, a parity bit will be generated for each frame. The technique of generating parity bits on a frame basis may be referred to as the "short check." Thus a conventional system may be designed to accommodate a nine bit frame including eight information bits and one parity bit.

When the information stored on the magnetic tape is retracted therefrom, a check for errors will be effected in the above-outlined manner. In effecting the generation of a parity bit for a frame of information and in subsequently rechecking the information and parity bits, the operation may be described as being performed on parallelly adjacent bits.

It has heretofore been recognized that when errors occur, they are more prone to occur in bursts than as single isolated instanecs. In addition, any burst of errors is more likely to arise as a string, as in a single channel, whereby the errors occur in corresponding bit positions of successive frames rather than as a multiplicity of errors in a single frame. The reason for this is in some respects due to the fact that the adjacent bits comprising a single frame on tape are not packed as closely as the bits representing corresponding bit locations of successive frames.

Notwithstanding the above-outlined disadvantages, it has heretofore been suggested to computed the parity or check bit by processing the information bits in blocks of fixed length whereby corresponding bits of successive frames may be used in the generation of the parity bit. This technique has been designated as "the long count" for readily apparent reasons. Although computing parity by means of the long count does entail an increased probability of encountering an undetectable double error, there are other advantages associated therewith. In particular, the number of bits per frame is no longer a limiting factor. However, this does means that the information must be processed in blocks, that is, in a non-continuous manner. A compensating advantage of employing the long count lies in the fact that the number of bits per redundancy bit may be increased appreciably over the somewhat analogous technique of computing the parity bit by utilizing those bits comprising a frame of information. However, this decrease in the number of redundancy bits is done by sacrificing somewhat the assurances against a double error going undetected.

In order to overcome somewhat the disadvantages common to both the long and short check techniques outlined above, it has heretofore been proposed to compute the parity bit by referencing a data field in a diagonal manner. More specifically, the information constituting the data field may be sensed in a time-oriented manner. Thus, for example, sensing means corresponding to the storage locations of a frame of information may have the sensing means associated with stage 1 actuated during time 1, the sensing means associated with stage 2 actuated during time 2, etc., etc. In this manner, the information sensed during time 1 will be added Modulo 2, hereinafter referred to as Mod 2, during time 2 with the information sensed during that time cycle and the resultant sum again added Mod 2 to the value stored in stage 3 during time cycle 3. In this manner, the corresponding bit of each successive information frame is sampled during succeeding timing periods. It should be noted that in itself the above-outlined technique for generating a parity bit from a diagonalized data field offers little more than the conventional short count in that they both permit processing of the information on a continuous basis.

In recognition of the limitations inherent in the above-outlined single error detection routines, more sophisticated redundancy techniques have been devise which, in addition to effecting the detection of an error, are designed to permit the automatic reconstruction of the original data. An example of this latter type of redundancy technique is that disclosed in the patent to R. M. Bloch issued Mar. 28, 1961, bearing Patent No. 2,977,-047 entitled "Error Detection and Correction Apparatus."

In explanation of the Bloch technique, consider a group of information or data words being readied for storage. Further, assume that each of the data words has associated therewith a check bit which may take the form of a single parity bit or a more complex weight count, either of which may have been generated in accordance with the principles of the earlier of the aforementioned Bloch patents. The bits positioned in corresponding locations of the group of data words are first summed Mod 2 in the manner outlined above as the long count technique. The resultant sum, designated as the restoration monitor, may then be transferred with the data words to a secondary storage area. Subsequently, when the previously stored information is to be used, the data words are scanned and summed Mod 2. Should this second scanning and summing operation establish that an error has occurred in the transmission of the group of data words, further manipulation of these groups and its associated restoration monitor will result in the latter being restored to its original value. More specifically, the corresponding bit locations of the group of data words are resummed Mod 2, the resultant sum being designated as the control monitor. A correction number called the restoration constant is next generated through the addition Mod 2 of the restoration monitor and the control monitor. Once the restoration constant has been generated, it is added Mod 2 with the data word known to be in error, which in turn results in the correction of the erroneous data word. In utilizing the short and long checks to effect the detection and correction of a data field, the Bloch error detection and correction technique requires that the data must be processed in blocks of fixed length and that special manipulative steps are necessary to carry out the desired operations.

Recognizing the limitations inherent in the error detection and correction system of Bloch, relative to the necessity of processing the information in blocks of predetermined length, it has heretofore been proposed to effect the continuous processing of data. An example of a continuous error detection and correction system is one designed exclusively for monitoring serially transmitted data. In accordance with a preferred embodiment of this latter technique, each data bit has associated therewith a pair of redundancy bits. Each of these redundancy bits is in turn associated with two distinct groups of information bits which, other than the single data bit, are mutually exclusive. Inasmuch as there is but a single bit common to both groups of bits for which any particular pair of parity bits has been generated, an indication of an unfavorable comparison established for a pair of parity bits generated from the transferred information and those parity bits previously generated for the same two groups of bits, indicates that the faulty bit is necessarily that bit common to both groups.

Obvious limitations associated with this latter technique concern the extraordinarily high proportion of redundancy information necessary to insure the verification of the transmission. This consideration must also be taken into account in the determination of the transfer rate of the associated system. Recognition must further be given to the fact that, at least with respect to the above-outlined embodiment, there is an equal probability that any error which occurs is in the redundancy information itself. A further inherent limitation concerns the inability of such a system to cross-correlate the redundancy bits with the data bits representing the entire field. Since the theory of the technique as outlined above is limited to the serial processing of data, in order to adapt it to the more conventional parallel data processing systems, an expensive duplication of circuitry is necessitated.

Accordingly, a principal object of the present invention is to provide a system for the manipulation of digital information or data which is characterized by its ability to effect the detection and correction of errors occurring in the manipulation of parallel-oriented information or data in an "on-the-fly" manner.

It is a further more specific object of the present invention to provide means associated with a data processing system to detect and correct errors occurring in a data field on a continuous basis by utilizing conventional parity checking techniques.

It is a further more specific object of the present invention to provide means associated with a data processing apparatus for effecting the continuous detection and correction of errors occurring therein, wherein conventional parity checking techniques are utilized to enable the processing of the bits constituting the data field in a parallel manner and wherein the conventional parity technique interrelates the bits in a parallel and diagonal sense.

Another object of the present invention is an apparatus for the detection and correction of errors occurring in parallelly-oriented data in a continuous and uninterrupted manner by using parallel and diagonal parity checks.

In achieving the objects and advantages of the present invention, information constituting a continuous data field is processed in a parallel manner whereby a pair of parity bits, generated by somewhat conventional parity checking techniques, are generated. More specifically, the information constituting the data field, which for instance may be in the form of a plurality of successive frames of information being readied for transfer to tape or some other secondary storage area, are entered into corresponding stages of a plurality of shift registers wherein the information is advanced through corresponding stages during successive operative cycles. A first parity bit generator is provided which generates parity bits in accordance with the conventional short count; that is, the information bits of a single frame are taken into consideration in the generation of a parity check bit which insures that even or odd parity will obtain for that particular group in accordance with the convention adapted. In a somewhat similar manner, a second parity bit generator is provided which, in generating a parity bit, takes into consideration the nature of the information bits in diagonally adjacent stages of the plurality of shift registers. Accordingly, means are provided to sense the contents of bit 1 of frame 1 and simultaneously sense the contents of bit 2, frame 2; bit 3, frame 3, etc., etc. As each parity bit is generated, it is entered into a shift register and advanced with the corresponding information bits.

After being in some way manipulated, either through transmission or storage, the information constituting the data field and associated parity bits are entered into a decoding portion which likewise constitutes a plurality of multi-stage shift registers. As the information is advanced through succeeding stages of the decoder sihft registers, an error detecting operation is performed thereon. In this latter operation, means are energized to isolate the faulty data bit. This error isolating means includes a plurality of error localizing members each of which senses in a parallel sense the information and parity bits located in corresponding positions of said plurality of shift registers. Also provided is a diagonal error localizing portion which senses the information in diagonally adjacent stages of said plurality of shift registers. A single one of the bit locations being sensed by each of said parallelly-oriented error localizing members is common to the diagonal sensing means associated with the diagonal error detection portion. A plurality of bit restoration means are provided, one each being positioned between each of said diagonally sensed shift register stages and the next succeeding stage therein. Accordingly, as an error is localized through the cross-correlating efforts of the diagonal and parallel detecting means, the associated bit restoration member is actuated to effect the complementation of the information bit as it is transferred therethrough. Associated with each of the bit restoration means are a plurality of conditioning devices designed to prevent inaccurate corrections in the event of multiple errors. Accordingly, it is a further object of the present invention to provide an apparatus for effecting the detection and correction of errors occurring in parallely-oriented data in a continuous and uninterrupted manner and for protecting against the miscorrection of said data in the event of multiple errors.

For a better understanding of the invention, its advantages and specific objects to be obtained with its use, reference should be had to the accompanying drawings and descriptive matter in which there is illustrated and described a preferred embodiment of the invention.

Of the drawings:

FIGURE 1 is a diagrammatic representation of a logical circuit in which input information and its monitors may be handled and generated;

FIGURE 2 discloses a digital representation oriented in a manner which is compatible with the logical elements of FIGURE 1;

Figure 6:
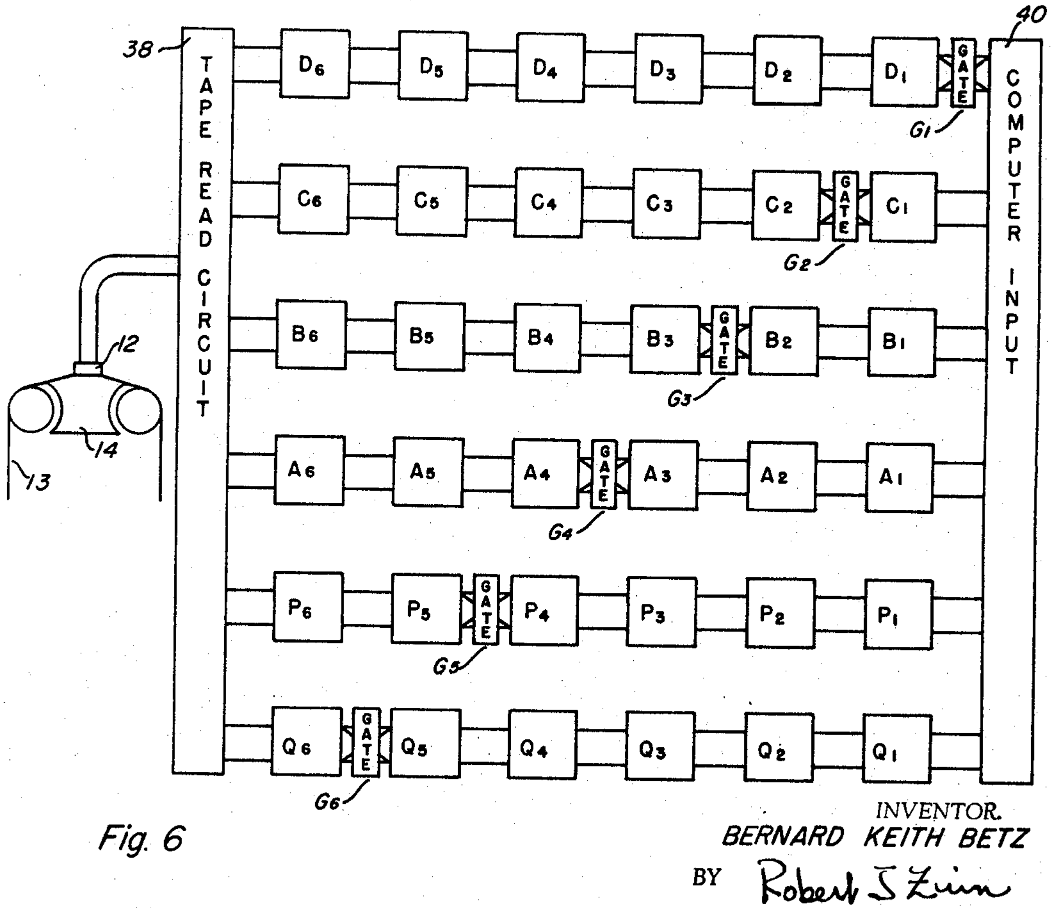
FIGURE 6 is a logical representation of an error correction unit constructed in accordance with the principles of the present invention.
Figure 8:
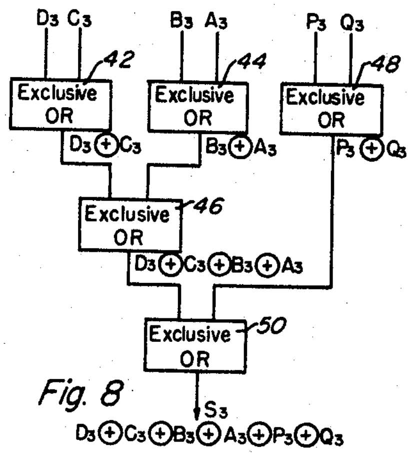
Figure 10:
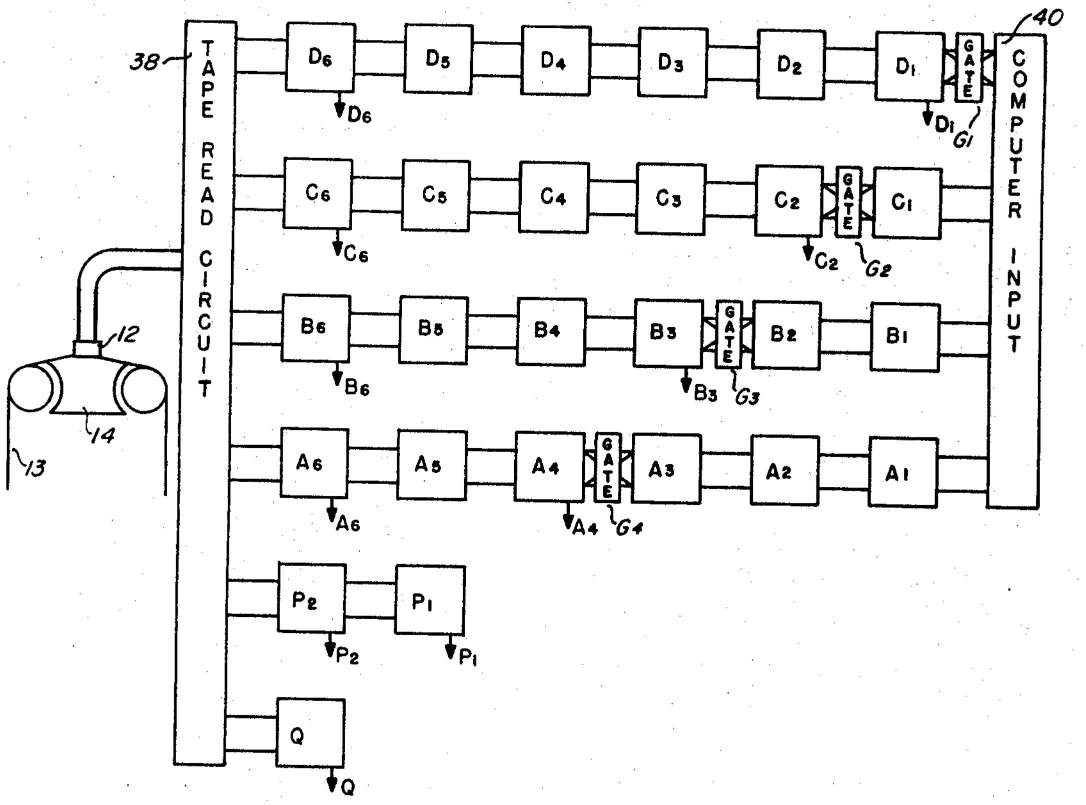
Figure 10:
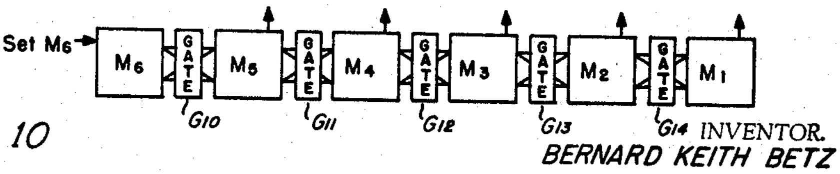
Figure 9:
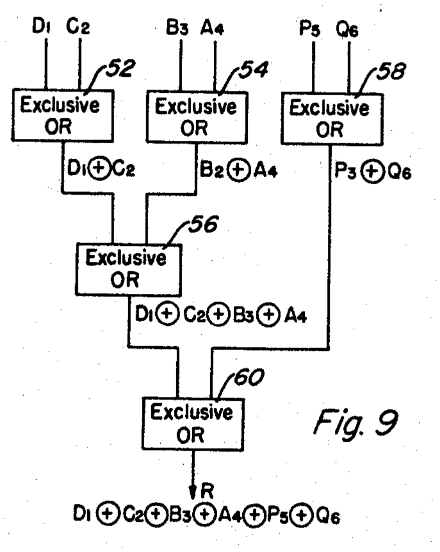
Figure 11:
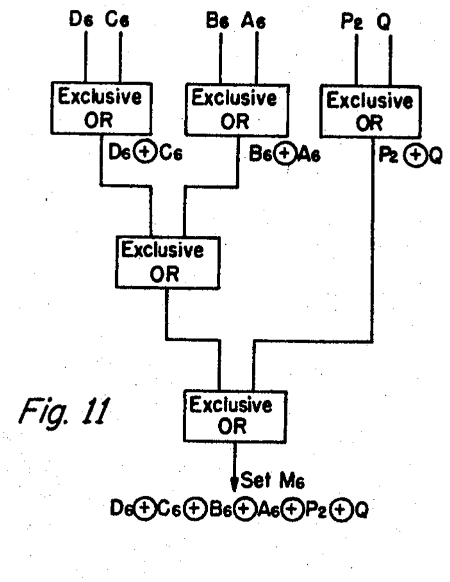
Figure 12:
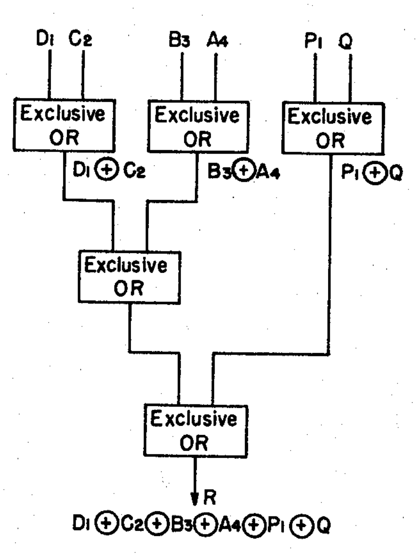
Figure 13:
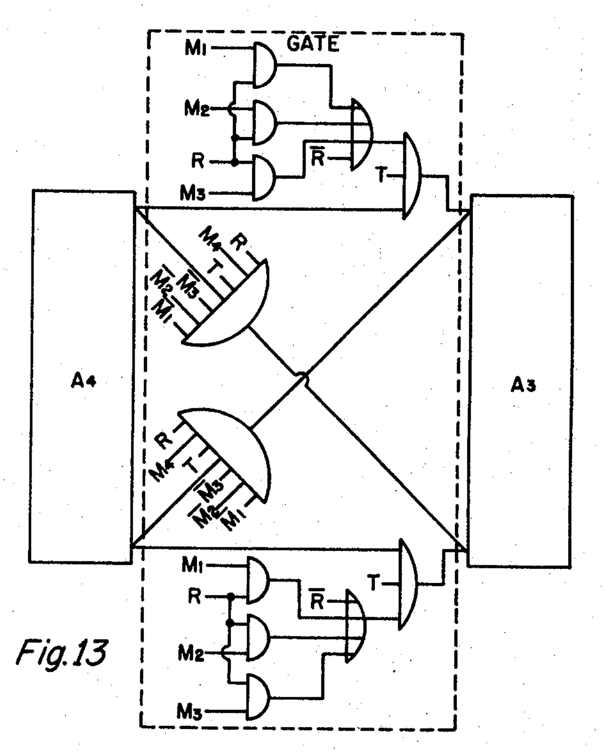
Figure 14:
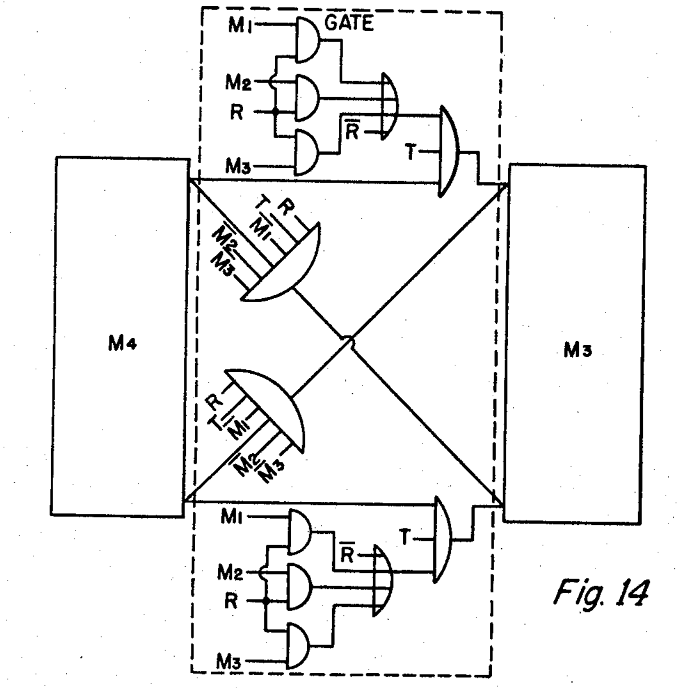
Figure 15:
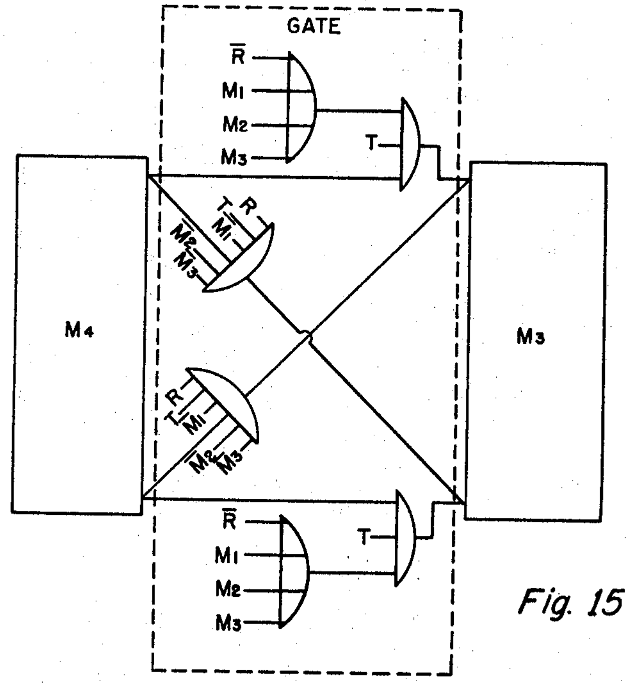

FIGURE 8 illustrtaes an error detection portion of hte present invention;

FIGURE 9 illustrates a further error detection circuit utilized in the practice of the present invention;

FIGURE 10 illustrates another modification of the error correction unit of FIGURE 6;

FIGURE 11 illustrates an error detection circuit for the circuit of FIGURE 10;

FIGURE 12 illustrates a further error detection circuit utilized with the circuit of FIGURE 10;

FIGURE 13 is a diagrammatic representation of a logic circuit utilized in the circuit of FIGURE 10;

FIGURE 14 is a diagrammatic representation of a further logic circuit utilized in the circuit of FIGURE 10;

FIGURE 15 illustrates another modification of the logical circuit of FIGURE 14.

Figures 1, 2:
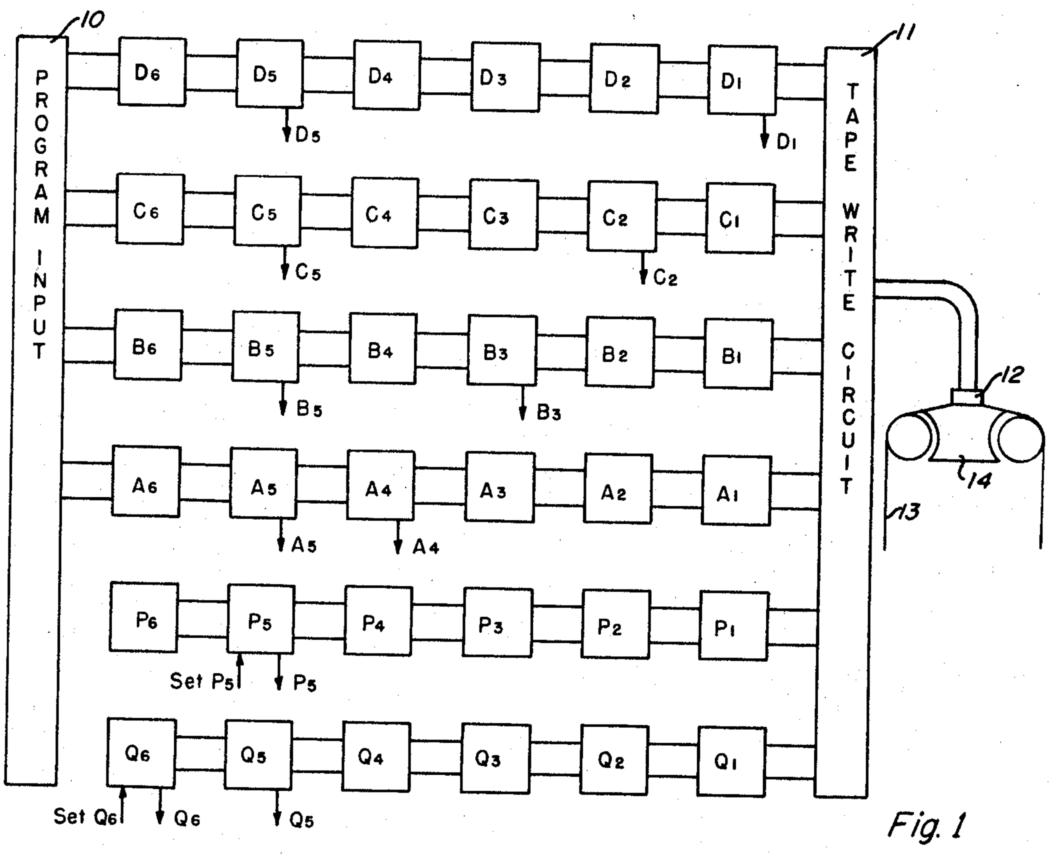

Referring first to FIGURE 1, therein is shown an encoding portion of a data restoration system constructed in accordance with the principles of the present invention. It is a function of the encoder of FIGURE 1 to effect the parallel transfer of information bits, from a source not shown, through program input means 10 whereafter corresponding bits are stored in storage elements $A_6$, $B_6$, $C_6$ and $D_6$. Each of the storage elements $A_6$, $B_6$, $C_6$ and $D_6$ is further serially connected to a plurality of like members. The storage elements may be comprised of any conventional bistable device such as a magnetic core or electronic flip-flop. The serially connected bistable devices may in turn comprise a conventional shift register wherein, for example, the information bits, introduced in a serial manner at the input of stage A6, are advanced through stage A5 and eventually arrive at stage A1 during a subsequent operative time cycle.

It is the further primary function of the encoder of FIGURE 1 to determine the correct column and diagonal check bits for the information stored therein and to physically associate the information and check bits for future referencing. Thus, in addition to the plurality of shift registers provided for the storage of the information bits, a pair of multi-stage storage devices including storage elements $P_1$ through $P_6$ and $Q_1$ through $Q_6$ are provided to store the check bits generated through the selective summing of the information bits introduced into the aforementioned shift registers. More specifically, members $P_1$ through $P_6$ store check bits for the parallelly related information bits of the corresponding columns. Accordingly, member $P_1$ stores a check bit generated from the data located in bit positions $Q_1$, $A_1$, $B_1$, $C_1$ and $D_1$. Similarly, storage element $Q_6$ stores a check bit corresponding to the data located in the diagonally adjacent position $P_5$, $A_4$, $B_3$, $C_2$ and $D_1$. The pair of multistage storage devices used for storing bits $P_1$ through $P_6$ and $Q_1$ through $Q_6$ may be in the nature of the shift registers referred to above, which in turn may be of the type disclosed generally at pp. 144–148 in the publication entitled, "Arithmetic Operations in Digital Computers," by R. K. Richards, Von Nostrand Co., 1955.

In order to better appreciate the functioning of that portion of FIGURE 1 thus far introduced, reference is now made to FIGURE 2 which discloses a binary coded digital representation including information and check bits which are exemplary of those transmitted and generated respectively therein. In addition to the rows of information bits A, B, C and D, there are also shown two rows of check bits P and Q. The input information constituting rows A, B, C and D is fed in parallel through the program input member 10 of FIGURE 1 and thence to the corresponding storage elements $A_6$, $B_6$, $C_6$, D, $P_6$ and $Q_6$ located in the sixth column thereof. At this time, the diagonal detection circuit of FIGURE 3 effects the generation of a check bit for the diagonally associated information located in storage elements $A_4$, $B_3$, $C_2$, $D_1$ and $P_5$. Since only the first column of information bits of FIGURE 2 has entered the storage elements corresponding to column 6 of FIGURE 1, all other storage elements within FIGURE 1 necessarily contain a binary 0. Accordingly, the Q6 output of the diagonal detection circuit of FIGURE 3 will be a binary 0.

Figure 3:
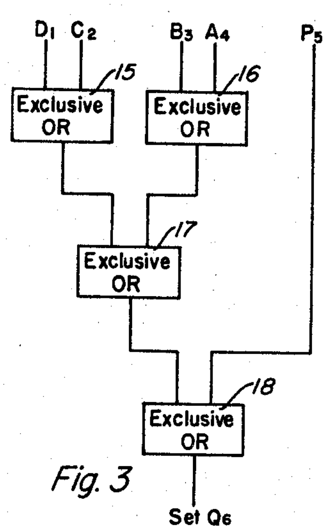
FIGURE 3 is a logical representation of a check bit generator.

In order to more fully appreciate the significance of this latter statement, consideration is now given briefly to the details of the circuitry of FIGURE 3. In this respect, FIGURE 3 discloses a plurality of Exclusive OR gates 15, 16, 17 and 18. Each of these Exclusive OR gates is in fact a Modulo 2 summing circuit, commonly referred to as a "half adder," which is characterized in that for two operands $U+V$ an affirmative output will be generated when the operand U or the operand V is true, but not when both are. The circuitry of an Exclusive OR circuit is disclosed in greater detail in FIGURE 4.

Figure 4:
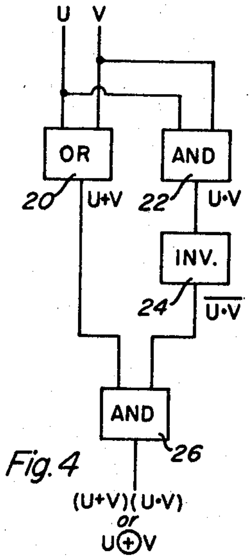
FIGURE 4 is a logical representation of a circuit element useful in implementing the present invention.

Referring now to FIGURE 4, therein is disclosed symbolically a pair of inputs U and V being fed in parallel to an OR circuit 20 and a first AND circuit 22. The OR circuit 20 is of the type which produces an output provided at least one of the two input leads is active. In accordance with common Boolean terminology the output of OR gate 20 is expressed as $U+V$ wherein the plus sign is indicative of the OR operation. AND gate 22 is also conditioned by the input signal U and V and is effective in generating an output $U \cdot V$ wherein the multiplication sign identifies the operation as being AND in nature. The output of the AND gate 22 is used to condition inverter 24. In the absence of the occurrence of the simultaneous inputs U and V, AND gate 22 will not be conditioned and the output of inverter 24 will remain "true," the latter condition being expressed as $\overline{U \cdot V}$. The output of OR gate 20 and inverter 24 serve as inputs to AND gate 26. The output of AND gate 26 is true in the instance where the output of OR gate 20 is true, indicating the presence of the signal U or V, and the output of inverter 24 is false, thus indicating that both U and V were not simultaneously active. This latter condition is expressed as $(U+V)$ $(U \cdot V)$, or more conventionally $U \oplus V$.

Referring once more to FIGURE 3, it is seen that the Modulo 2 summing circuit of FIGURE 4 is incorporated in each of the logic blocks 15, 16, 17 and 18. Thus the inputs D1 and C2 are summed Modulo 2 in logic block 15 and the inputs $B_3$ and $A_4$ are summed Modulo 2 in logic block 16. The outputs of logic block 15 and 16 in turn serve as inputs to logic block 17, this latter logic block will have an output which will take the following form: $A_4 \oplus B_3 \oplus C_2 \oplus D_1$. Similarly, the output of logic block 17 serves as one input to logic block 18 in common with a signal from storage element $P_5$, the output of logic block 18 in turn being expressed as $$A_4 \oplus B_3 \oplus C_2 \oplus D_1 \oplus P_5.$$

The latter output function represents the half added sum of the input functions $A_4$, $B_3$, $C_2$, $D_1$ and $P_5$, the result being somewhat independent of the order in which the operations are performed.

Assuming that the information of column 1, FIGURE 2 has been registered in column 6 of the encoder of FIGURE 1, a binary 0 will be stored in positions $D_1$ and $C_2$ so that output of Exclusive OR circuit 15 will be a 0. Similarly, the contents of storage elements A4 and B3 are binary 0's so that the output of Exclusive OR circuit 16 is a 0. With the outputs of Exclusive OR circuits 15 and 16 both 0, the output of Exclusive OR circuit 17 will also be 0. Since the contents of the storage element $P_5$ has been assumed to be 0, the output of Exclusive OR circuit 18 will be 0 and the conditions for the generation of a signal SET $Q_6$ will not have been satisfied so that bit position $Q_6$ of the encoder of FIGURE 1 will continue to register a binary 0.

When the next column of information is shifted into the circuit of FIGURE 1, that is the information shown in column 2 of FIGURE 2, the information in the sixth column will be shifted into the fifth column. The outputs of storage elements $A_5$, $B_5$, $C_5$ and $D_5$ as well as the output from $Q_5$ form the input signals to the check bit generating circuit of FIGURE 5.

Figure 5:
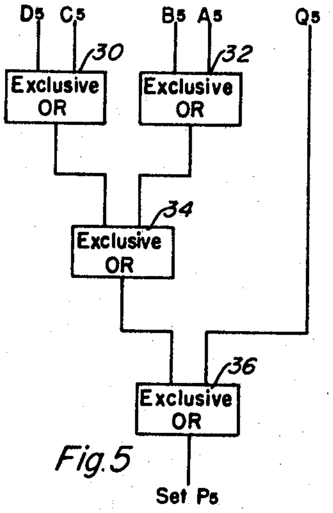
FIGURE 5 illustrates a further logical circuit for generating a check bit.

The check bit generating circuit of FIGURE 5 is identical to that of FIGURE 3 with the exception of the inputs thereto as noted above. By again considering the digital representation of column 1 of FIGURE 2 as presently located in column 5 in the encoder of FIGURE 1 and which in turn serve as inputs to the circuitry of FIGURE 5, the nature of the check bits for the parallelly related bits of column 5 may now be established. The $D_5$ and $C_5$ inputs to the Exclusive OR circuit 30 of FIGURE 5 are a binary 1 and a binary 0 respectively; accordingly the output of Exclusive OR circuit 30 will be a binary 1. Similarly, the input $B_5$ and the input $A_5$ of the Exclusive OR circuit 32 of FIGURE 5 are a binary 0 and a binary 1, so that the output of Exclusive OR circuit 32 will be a binary 1. Since both of the inputs to the Exclusive OR circuit 34 are binary 1's, the output of this circuit will be a binary 0 which in turn forms one input of the Exclusive OR circuit 36. The other input of Exclusive OR circuit 36 is connected to $Q_5$ which, since $Q_6$ was set to 0 during the previous diagonal check memory element $Q_5$ will be in the 0 state at this time. Therefore, the SET $P_5$ output of Exclusive OR circuit 36 will be binary 0 and the contents of the memory element $P_5$ will remain as a biny 0. Since the diagonal memory elements $D_1$, $C_2$, $B_3$, $A_4$ and $P_5$ are still in the binary 0 state, memory element $Q_6$ will also be in the binary 0 state.

As the next time information is shifted into the circuitry of FIGURE 1, the information from the fifth column will be shifted to the fourth column while the information from the sixth column will be shifted to the fifth column. Again referring to FIGURE 2, it is seen that the information now stored in the A, B, C and D memory elements of the fifth column of FIGURE 1 will be the same as that shown in the second column of FIGURE 2; that is, memory element $A_5$ will register a binary 1, memory element $B_5$ a binary 0, memory element $C_5$ a binary 1 and memory element $D_5$ a binary 1. Memory element $Q_5$ will register a binary 0 since the information shifted thereto from element $Q_6$ at the conclusion of the preceding operative cycle was a binary 0. The outputs $A_5$, $B_5$, $C_5$, $D_5$ and $Q_5$ which are fed to the columnar check bit generator of FIGURE 5 will thus result in the SET $P_5$ output of this circuit being actuated indicating a binary 1. This signal will in turn be coupled to the SET $P_5$ input terminal of memory element $P_5$ and will consequently set this memory element to the binary 1 state.

Since the information in memory elements $D_1$, $C_2$ and $B_3$ are binary 0's, while the information stored in memory element $A_4$ and $P_5$ are binary 1's, the diagonal check circuit shown in FIGURE 3 will produce a SET $Q_6$ output which is a binary 0. This signal is coupled to the SET $Q_6$ input of memory element $Q_6$ and sets this memory element to the zero state. All of the information to be stored on the tape is fed through the circuit of FIGURE 1 in the manner described above and this circuit automatically adds the column and diagonal partity checks to the input information.

The plurality of information and check bits, after being advanced through the lowest order stage (i.e. bit positions A, B, C, D, P and Q) of the associated shift registers comprising the encoder of FIGURE 1, are fed into a transfer circuit 11. The transfer circuit 11 may in turn be used to feed the signals, in appropriate form, to a multichannel magnetic recording head 12 so that the information and check bits may be recorded on a magnetic tape 13, the latter being controlled in its movement past the recording head by a suitable tape transport mechanism 14.

Referring now to FIGURE 6, there is shown the decoder portion of a data restoration system constructed in accordance with the principles of the present invention. Functionally the decoder of FIGURE 6 serves to monitor the information transferred thereto from the encoder of FIGURE 1 and automatically correct any errors which may have occurred during the transmission thereof. A tape read circuit 38 is provided to sense the information and check bits previously stored on the tape 13 by the encoder of FIGURE 1. In this respect, the multi-track magnetic recording head 12 is operatively positioned with respect to the surface of tape 13 to enable signals stored thereon to be transferred to the tape read circuit 38 in a continuous manner during successive operative cycles. After being introduced into the tape read circuit of 38, the information and check bits constituting the digital representation are transferred through successive stages of the error correcting unit eventually arriving at the computer input, represented herein generally as member 40, wherein the information and check bits are separated.

The decoder of FIGURE 6 is somewhat similar to the encoder of FIGURE 1 in that it comprises a plurality of storage elements such as flip-flop devices which are designated in accordance with the system used to identify the information and check bit positions within the encoder of FIGURE 1. Thus the rows of storage elements labeled $A_1$ through $A_6$, $B_1$ through $B_6$, $C_1$ through $C_6$ and $D_1$ through $D_6$ store information signals while the row P1 through P6 stores check bits for each column, and the storage element $Q_6$ stores the check bits for the diagonally adjacent storage elements $D_1$, $C_2$, $B_3$, $A_4$ and $P_5$.

Figure 7:
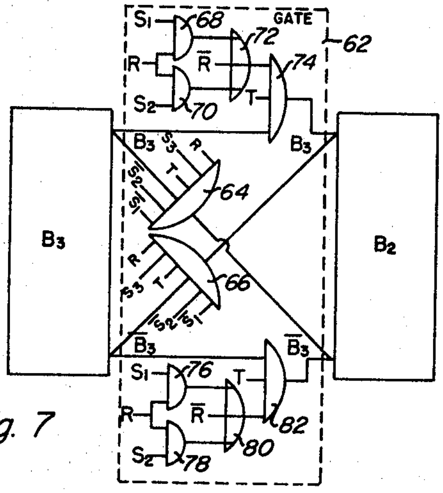
FIGURE 7 illustrates diagrammatically a circuit for inverting one of the bits of information being handled by the circuitry of FIGURE 6.

Positioned between each of the diagonally adjacent storage elements $D_1$, $C_2$, $B_3$, $A_4$, $P_5$ and $Q_6$ and the next succeeding location within the data store are gating devices $G_1$ through $G_6$ which may be conditioned to pass the stored information from the preceding storage element either in a direct or inverted fashion. The conditioning of gates $G_1$ through $G_6$ which effect the inverted, or direct, transfer of the information is predicated upon the detection, or non-detection respectively, of an error existing simultaneosuly in one stage of the diagonally sensed stages as well as in the parellelly adjacent stages in which said one of said diagonally sensed stages is represented as a common element. As an example of the functioning of gating devices $G_1$ through $G_6$, assume that storage element $B_3$ is storing a one bit. When this one bit is transferred to the $B_2$ storage element, it can either be transferred directly to $B_2$ so that stage $B_2$ will store a one bit, or can be inverted as it is transferred to $B_2$ so that $B_2$ will store a zero bit. FIGURE 7 discloses the logic circuit necessary to effect the direct or inverted transfer of information from stages $B_3$ to $B_2$ as discussed above. Further explanation as to the logical organization and operation of FIGURE 7 is delayed pending a fuller explanation of the operation of the decoder of FIGURE 6 itself.

In explanation of the operation of the decoder portion disclosed in FIGURE 6, reference is again made to FIGURE 2 which may now be considered as representing the sample of the previously encoded information and check bits being read from the tape 13 through the tape read circuit 38 as it is fed to the error correcting unit before being passed to the computer input 40.

In order to demonstrate the error correcting abilities of the decoder of FIGURE 6, assume that the bit in the eighth column in the B row of the data representation of FIGURE 2 is in error; that is, a zero instead of a one. As the eighth column is fed from the tape read circuit 38 into the first memory element comprising storage elements $D_6$, $C_6$, $B_6$, $A_6$, $P_6$ and $Q_6$, detection means associated therewith will detect that one of the memory elements is in error. The error detection circuit used to sense errors occurring in parallelly adjacent data storage elements is of the type represented in FIGURE 8.

FIGURE 8 discloses a detection circuit similar to that used for generating the check bit, for the information in column 6, the only difference being that the inputs to the circuit would be $D_6$, $C_6$, $B_6$, $A_6$, $P_6$ and $Q_6$ instead of those shown. Each of the Exclusive OR circuits shown in FIGURE 8 is similar to those discussed above with respect to FIGURES 3 and 5. From FIGURE 2 it can be seen that the information fed to the inputs D6 and C6 of Exclusive OR circuit 42 of FIGURE 8 are binary 1's so that the output from Exclusive OR gate 42 is a binary 0. The inputs from the B6 and A6 storage elements are both binary 0's as this corresponds to the value shown for A6, and since the B6 bit is assumed to be in error. Accordingly, the output from Exclusive OR circuit 44 of FIGURE 8 is also a binary 0. The output of Exclusive OR circuits 42 and 44 are fed to an Exclusive OR circuit 46, and since both the input signals thereto are binary 0's, the output of Exclusive OR circuit 46 will also be a binary 0. The inputs from elements P6 and Q6 to Exclusive OR circuit 48 will be a binary 0 and a binary 1 respectively, so that the output thereof will be a binary 1. The binary 0 output of Exclusive OR 46 and the binary 1 output of Exclusive OR 48 are fed to the inputs of Exclusive OR 50, the output of which is accordingly a binary 1.

Each column of parallelly adjacent storage elements comprising corresponding bits of the parallelly oriented information and check bits has associated therewith a detection circuit in the nature of that disclosed in FIGURE 8. The output of each detection circuit of each column is designated S with an appropriate subscript. That is, $S_6$ for column 6, $S_5$ for column 5, $S_3$ for column 3, etc.

The generation of an output signal from any one of the detectors corresponding to the parallelly oriented information and check bits indicates that the faulty information or check bit is included in one of the plurality of storage elements associated therewith. Accordingly, as the data representation of column 8 of FIGURE 2 is monitored by the column 6 detector circuit, the binary 1 output signal indicates that one of the bits is in error. Even though an error is detected in the input information, no correction is made at this time.

As the next column of information is shifted into the error correction circuit, the information stored in column 6 will be shifted to column 5 and the faulty information bit will now be located in memory element $B_5$. The detection circuit associated with column 5 will generate a signal $S_5$ at its output indicating that the faulty bit is now located in one of the parallelly adjacent storage elements thereof; still the error is not corrected. When the next information column is shifted into the decoder of FIGURE 6, the information previously located in column 5 will be shifted to the corresponding locations of column 4 so that the faulty information bit will now be located in storage element $B_4$. Again the detection circuit associated with column 4 detects the presence of the error, but again no corrective action is taken. The next time information is shifted into the decoder of FIGURE 6, the error will be shifted to the third column and the memory element $B_3$ will be in error. At this time the output of the detection circuit shown in FIGURE 8 for the third column will be a binary 1. That is, signal $S_3$ will be a binary 1. At the same time, the signals from the diagonally-adjacent storage elements $D_1$, $C_2$ $B_3$, $A_4$, $P_5$ and $Q_6$ are fed to the detection circuit shown in FIGURE 9. Except for the inputs, the circuit of FIGURE 9 is structurally identical to that of FIGURE 8 and operates in the same manner.

Referring once more to the digital representation of FIGURE 2, it can be seen that the signal located in D row—column 6 which is presently in storage element $D_1$ of FIGURE 6 is a binary 0. Similarly, the information at the row C—column 7 bit position is a binary 0. We have already assumed the information in storage element $B_3$ to be a binary 0 when it should have been a binary 1. Through further reference to the digital representation of FIGURE 2, it will be noted that the $A_4$ signal is a binary 0, the $P_5$ signal is a binary 0, and the $Q_6$ signal is a binary 1. With these signals fed to the corresponding inputs of the diagonal detection circuit of FIGURE 5, the output of this circuit is a binary 1. More specifically, the $D_1$ and $C_2$ inputs to Exclusive OR circuit 52 both being 0, result in a binary 0 output therefrom. Similarly, since the $B_3$ and $A_4$ inputs to Exclusive OR circuit 54 are both binary 0's, the output therefrom will also be a binary 0. The outputs of Exclusive OR circuits 52 and 54 in turn form the input to Exclusive OR circuit 56. Since both of these are binary 0's, the output of Exclusive OR circuit 56 will also be a binary 0. Inputs $P_5$ and $Q_6$ to Exclusive OR circuit 58 are represented as a binary 0 and a binary 1 respectively. Accordingly, the output of Exclusive OR circuit 58 is a binary 1 which in combination with the binary 0 output of Exclusive OR circuit 56 form the inputs of Exclusive OR circuit 60, the output of which is designated by the letter R and in this instance is a binary 1. The outputs of the third column detection circuit $S_3$ and the diagonal detection circuit R are fed to the gate circuit between the output of $B_3$ and the input of memory element $B_2$. As mentioned above, the logic of this gate circuit is disclosed in detail in FIGURE 7.

Referring now to FIGURE 7, it can be seen that in addition to the above-described signals $S_3$ and R, the outputs of the first and second column detection circuits $S_1$ and $S_2$, as well as a timing signal T, are fed to the gate circuit $G_3$, indicated herein generally as member 62. Considering the circuitry of FIGURE 7 more specifically, therein is shown a pair of multilegged AND gates 64 and 66 which when properly conditioned function to transfer the bit representation previously stored in memory element $B_3$ to memory element $B_2$ in inverted fashion. The conditioning leads connected to AND gates 64 and 66 are identically constituted except for the input signals $B_3$ and $\overline{B}_3$ which represent the conditional value of stage $B_3$ which is to be invertedly advanced to stage $B_2$. Thus, in addition to the signal $B_3$ or $\overline{B}_3$ signals R, T, $\overline{S}_1$, $\overline{S}_2$, and $S_3$ complete the conditioning of gates 64 and 66.

In the absence of an error associated with the information presently in memory element $B_3$, means are provided for advancing the representation therein in a direct fashion to storage element $B_2$. Included in the circuitry for effecting the direct transfer of the information in memory element $B_3$ to memory element $D_2$ are a pair of AND gates 68 and 70 conditioned in part by input signals $S_1$ and $S_2$ respectively as well as signal R common to both. The outputs of AND gates 68 and 70 are in turn buffered through OR gate 72 to which the input $\overline{R}$ is also connected. The output of buffer 72 serves as a conditioning input to AND gate 74 which is further conditioned by timing signal T and the signal $B_3$ representing the "set," or binary 1, side of storage element $B_3$. The output of AND gate 74 is in turn connected to the input of storage element $B_2$ and when activated is effective in setting storage element $B_2$ to its binary 1 state. The combination of AND gates 76 and 78, OR buffer 80 and AND gate 82 are similarly conditioned by inputs T, R, $\overline{R}$, $S_1$, $S_2$ and $\overline{B}_3$ to transfer an indication of a previously established binary 0 from storage element $B_3$ directly to storage element $B_2$.

In general, the gate circuit between memory element $B_3$ and $B_2$ operates as follows: if the output signal of the column detection circuit for the third column, namely $S_3$ as shown in FIGURE 8, is a binary 1 at the same time that the output signal R of the diagonal detection circuit shown in FIGURE 9 is a binary 1, then the bit stored in memory element $B_3$ will be inverted as it is transferred to memory element $B_2$. If either or both of the outputs of the detection circuit of FIGURE 8 and FIGURE 9 are 0, the binary bit stored in memory element $B_3$ will be transferred directly to memory element $B_2$.

In the example under consideration, the bit in memory element $B_3$ was assumed to be a binary 0 when it should have been a binary 1. After advancing to column 3, the faulty bit effectively identifies its location by initiating the generation of binary 1's both for the signal $S_3$ corresponding to the detection circuit of the third column, as well as signal R corresponding to the output of the diagonal detection circuit of FIGURE 9. According to the above-outlined theory of operation of the gating device disclosed in FIGURE 7, the binary 0 in memory element $B_3$ will be changed to a binary 1 when it is shifted to memory element $B_2$, thereby correcting the error in the tape stored information.

The significance of signals $S_1$ and $S_2$ and their complements as utilized in the gate circuit of FIGURE 7 is to prevent inaccurate corrections in the event of multiple errors. This correction circuit is based on the assumption that if multiple errors occur, they will occur in the same row, and not in adjacent rows. That is, if the digital representation stored in the storage elements of FIGURE 6 included multiple errors, the erroneous bits would be stored in memory elements $B_3$, $B_4$ and $B_5$ rather than in memory elements $C_3$, $B_3$ and $A_3$. The reason for this is primarily due to the fact that the packing density between bits in the same row is much smaller than is the packing density between bits in adjacent rows.

Again referring to FIGURE 6, it is clear that if memory element $B_3$ and memory element $B_4$ both contain faulty bits, then the column detectors for the third and fourth columns both produce a binary one output, as does the diagonal detector circuit of FIGURE 9. Accordingly, means including the extra signal inputs $S_1$, $S_2$, $S_3$, and their complements are positioned between the output of the $A_4$ memory element and the input of the $A_3$ memory element so as to prevent the gate circuit $G_4$ from being activated and thereby invert the information being transferred from memory element $A_4$ to memory element $A_3$. Again referring to FIGURE 7, it is noted that the information bit located in storage element $B_3$ will be transferred directly to storage element $B_2$ any time the output of the diagonal detection circuit is a binary 0, that is, the signal $\overline{R}$ prevails. A direct transfer will also occur if the output of the diagonal detection circuit is a binary 1 and any one of the lower order column detection circuits is a binary 1. Thus, in the operation of the gating circuit of FIGURE 7, the output of memory element $B_3$ will be inverted, as it is transferred to storage element $B_2$ whenever the output of the diagonal detection circuit of FIGURE 9 is a binary 1, or the output of the third column detection circuit is a binary 1, and the output of all the lower order column detection circuits are binary 0's. In either event, the information leaving column 1 and entering the computer input, indicated generally as member 40, will do so as a corrected digital representation.

FIGURE 10 discloses an alternative embodiment of an error correction circuit constructed in accordance with the principles of the present invention. The input portion of the error correction circuit of FIGURE 10 includes the tape read circuit 38 operatively connected through the multi-channel magnetic recording head 12 to a source of digital information stored on magnetic tape 13, which tape is advanced past said magnetic recording head by a suitable tape transport mechanism 14. The aforementioned tape input circuit is a duplication of the components in the equivalent portion of FIGURE 6. Also common to the circuitry of FIGURES 6 and 10 are the plurality of data storage elements $D_1$ through $D_6$, $C_1$ through $C_6$, $B_1$ through $B_6$, and $A_1$ through $A_6$. These storage elements are interconnected in the manner described above with respect to the equivalent members of FIGURE 1. The storage elements comprising the various rows of the decoder of FIGURE 10 are serially connected to enable the continuous transfer of information located in one of the data storage elements to advance through the various storage locations during successive operative cycles. Accordingly, each of the storage locations includes means operatively connected therewith for advancing the digital representation therethrough during successive operative cycles. These last-named means for synchronizing the flow of information through the error correction circuit of FIGURE 10 may be comprise of conventional timing means, not shown. Also common to the circuitry of FIGURES 6 and 10 are gates $G_1$ through $G_4$ which have the same relative position with respect to the information bits. However, it is noted that only a pair of storage elements $P_1$ and $P_2$ are provided for the parallelly associated check bits, and a single stage Q for the diagonal check bit. As a functional substitute therefor, a plurality of storage elements $M_1$ through $M_6$ are provided, including gating devices $G_{10}$ through $G_{14}$ positioned between adjacent storage elements.

In the operation of the circuit of FIGURE 10, the input information is read from the tape and fed into the storage elements comprising column 6 of the correction circuit. While therein, the information is sensed by the sixth column detection circuit of FIGURE 11, which will determine, in the manner described above with respect to the operation of FIGURE 8, any errors which may exist in the input information. If any of the bits are in error, the SET $M_6$ output of the column 6 detection circuit of FIGURE 11 will be a binary 1 and this output will be fed to the SET $M_6$ output of the memory element $M_6$ thereby setting this memory element to the one state. As the information is shifted from the sixth column to the fifth column, the one bit in memory element $M_6$ is shifted to memory element $M_5$. Similarly, as the information is shifted to the fourth column, the one bit in the memory element $M_5$ will be shifted to memory element $M_4$.

If we assume that the information in the A row column 4 is in error, that is the bit now stored in memory element $A_4$ is in error, then, as indicated above, a binary 1 will be stored in memory element $M_4$. At the same time the digital representation in storage elements $D_1$, $C_2$, $B_3$, $A_4$, $P_1$ and Q will be sensed by the diagonal detection circuit of FIGURE 12. Referring now to FIGURE 12, it is seen that with the exception of the general input Q, as substituted for the more specific input $Q_1$ of FIGURE 6, the logical orientation and operation of the detection circuits of FIGURES 6 and 12 are otherwise equivalent. Accordingly, since memory element $A_4$ is assumed to contain a faulty bit, the resultant output of the diagonal detection circuit of FIGURE 12 will be a binary 1. The binary 1 output of the memory element $M_4$ and the binary 1 output R of the diagonal detection circuit of FIGURE 12 will be fed to the gating network $G_4$ of FIGURE 13 which is positioned between the output of memory element $A_4$ and the input of memory element $A_3$. In addition to the inputs $A_4$ and $M_4$, the gating network $G_4$ of FIGURE 13 further includes input signals R, $M_1$, $M_2$, $M_3$ and their complements as well as the timing signal T. The function of the extra signals $M_1$, $M_2$ and $M_3$ and their complements is to insure that information is not erroneously corrected in the event of multiple errors, the implementation of which is discussed more fully below.

In the operation of the gating circuit of FIGURE 13, the input information is initially monitored by the column detection circuit of FIGURE 11, the inputs of which are associated with the parallelly related bits of column 6. An error so detected results in the SET $M_6$ becoming true which in turn establishes a binary 1 condition in storage element $M_6$. The set condition established in storage element $M_6$ is forwarded during subsequent operative cycles, first to stage $M_5$, then stage $M_4$ etc. If the output of storage element $M_4$ is a binary 1 at the same time that the output R of the diagonal detection circuit is a binary 1, then the binary bit stored in memory element $A_4$ will be inverted as it is forwarded to stage $A_3$. Since in the example under consideration it has been assumed that bit $A_4$ was in error, the binary bit in memory element $A_4$ will automatically be complemented as it is forwarded to storage element $A_3$. After the information in memory element $A_4$ has been corrected, it is necessary that the one bit stored in memory element $M_4$ be returned to 0. In this respec, the gate circuit between the output of the memory elements, for example $M_4$, and the input to the next memory element $M_3$ is used to return the binary 1 signal to 0 after the correction has been accomplished. This gate circuit is shown in detail in FIGURE 14 and as a simplified embodiment, in FIGURE 15, both of which are discussed more fully below.

Referring now to the problem of multiple-errors, it can be readily seen that in the event of the occurrence of errors in both memory element $A_4$ and memory element $A_5$, there would be a binary 1 stored in memory element $M_4$ and memory element $M_5$. After correcting the error in memory element $A_4$, it is necessary to return the binary 1 signal in memory element $M_4$ to 0. However, the binary 1 signal in the memory element $M_5$ should not be returned to 0. Therefore, the logic signals fed to the gate elements between the various M memory elements are such that only the binary 1's stored in the lowest ordered memory element will be returned to 0 after correction. Referring to FIGURE 14, it can be seen that the binary 1 stored in memory element $M_4$ will be passed directly to memory element $M_3$ if any of the lower ordered memory elements, that is $M_1$, $M_2$ or $M_3$ contain a binary 1. However, if the lower order memory elements $M_1$, $M_2$ or $M_3$ are in the binary 0 state, so as to produce an $\overline{M}_1$, $\overline{M}_2$ and $\overline{M}_3$ output, then the binary 1 stored in memory element $M_4$ will be diagonally transferred to memory element $M_3$, or in other words, memory element $M_3$ will be in the binary 0 state.

FIGURE 15 is identical in operation to that shown in FIGURE 14 except that the direct gating circuit between memory elements $M_4$ and $M_3$ is considerably simplified. The simplified gate scheme of FIGURE 15 can also be used in FIGURES 7 and 13.

The circuitry described above is representative of one of many possible ways of implementing the principles of the present invention. In this respect, the provision of additional diagonal protection circuits is contemplated to enable the immediate localization of any detected error so that rather than necessitate any time delay during which the faulty information is shifting into an operable position, the detection and correction may be effected essentially simultaneously.

It will be apparent from the foregoing disclosure of the preferred embodiment of the invention that numerous modifications, changes and equivalents will now occur to those skilled in the art, all of which fall within the true spirit and scope contemplated by the preferred embodiment of the invention.

What is claimed is:

1. A digital data restoration system comprising a plurality of parallel related multi-stage shift registers adapted to store both data and redundancy information therein, said redundancy information selectively related in a parallel and diagonal sense to said data information, at least two of said multi-stage shift registers connected to transfer data information and an additional two of said multi-stage registers connected to carry said redundancy information related thereto, error detecting means connected to said informational and said redundancy channels to sense the presence of errors therein, a plurality of bit restoration means positioned between particular stages of said plurality of multi-stage shift registers, each of said bit restoration means being conditioned to alternatively effect the direct or inverted transfer of the digital data presently being transferred therethrough.

2. A digital data restoration system comprising a plurality of parallel related multi-stage shift registers two of which are information data transfer channels and an additional two of which are connected to be adapted to carry redundant information relative to said informational data in said two informational data transfer channels, an error detection portion including a plurality of first checking means, each of said plurality of first checking means adapted to simultaneously sense the data in parallelly adjacent stages of said plurality of shift registers including means for generating a signal indicating the detection of an error in the digital data stored therein, said error detection portion further including a second checking means adapted to sense the digital data in diagonally adjacent stages of said plurality of shift registers including means for generating a signal indicating the detection of an error in the digital data stored therein, a plurality of bit restoration means selectively connected to particular stages of said plurality of multi-stage shift registers and adapted to effect the direct or inverted transfer of the digital data presently being transferred therethrough, means connecting the output of said second checking means to said plurality of restoration means, and means connecting certain ones of said plurality of first checking means to said plurality of bit restoration means whereby the digital data restoration system is effective in preventing inaccurate corrections in the event of the occurrence of multiple errors therein.

3. A digital data manipulating apparatus comprising a plurality of parallel related multi-position shift registers, two of which are informational data transfer channels and an additional two of which are connected to be adapted to carry redundant information relative to said informational data in said two informational data transfer channels, an error detection portion including a plurality of first checking means being connected to sense successively higher orders of corresponding bit positions of said plurality of multi-position shift register so as to detect the occurrence of data error in any of the levels thereof, said error detection portion further comprising second error detection means including means for generating a signal indicating the detection of an error in the digital data in those stages associated therewith, a plurality of bit restoration means selectively connected to particular stages of said plurality of multi-stage shift registers and adapted to effect the direct or inverted transfer of the digital data presently being transferred therethrough, means connecting the output of said second error means as conditioning means to said plurality of bit restoration means, and means connecting the outputs of all lower order ones of said plurality of first checking means as conditioning signals for each of said plurality of restoration means whereby the digital data restoration system is capable of detecting and effecting corrections on-the-fly to a plurality of information and redundancy bits of a digital data representation being transferred therethrough and is further effective in preventing accurate corrections in the event of the occurrence of multiple errors.

4. In a digital data restoration system wherein said digital data includes both information and check bits selectively related in a parallel and diagonal sense, the combination comprising, a plurality of data storage elements, means for transferring said digital data to said plurality of data storage elements and for advancing said data through corresponding stages of said plurality of data storage elements during successive operative cycles, first error checking means connected to parallelly adjacent ones of said plurality of data storage elements and adapted to effect the selected summing of said information bits and said check bits located therein, second error checking means connected to diagonally adjacent positions of said plurality of data storage elements and adapted to effect the simultaneous selective summing of said information and check bits located therein, a plurality of bit restoration means, means operatively connecting said first and second checking means to said plurality of bit restoration means, said bit restoration means connected to be effective upon the occurrence of an error in said digital data representation to automatically restore said digital representation to its original form.

5. Digital data manipulating apparatus comprising a plurality of parallel related multi-position shift registers, adapted to store both data and redundancy information, said redundancy information selectively relate in a parallel and diagonal sense to said data information, at least two of said multi-position shift registers being used to store said informational data and an additional two of which are connected to carry said redundancy information related thereto, error checking means connected to said informational and redundancy channels to sense the presence of data errors, and bit restoration means connected to said last named means to automatically correct data errors detected during the transfer of informational data and redundancy data through said registers.

6. In an apparatus for the detection and correction of errors occurring in the transmission of a continuous digital representation, said digital representation including information bits and first and second redundancy bits representing selected summings of said information bits, the combination comprising, a plurality of data storage means adapted to store said information bits and said first and second redundancy bits in corresponding positions therein, first error checking means connected to parallelly adjacent positions of data storage means to effect the selected summing of said information bits and said redundancy bits located therein, second error checking means capable of effecting the simultaneous selective summing of the information and redundancy bits located in diagonally adjacent positions of said plurality of data storage means, a plurality of bit restoration means operatively connected to each of said diagonal adjacent positions of said plurality of data storage means, means operatively connecting said first and second error checking means to said plurality of bit restoration means whereby said latter means is effective upon the occurrence of an error in said digital representation to automatically restore said digital representation to its correct value.

7. In an apparatus for the detection and correction of error occurring in the transmission of parallel-oriented data using a diagonal parity checking technique which technique is further characterized by its ability to effect said detection and correction of errors in an "on-the-fly" manner, said apparatus comprising, a source of binary coded digital information, an encoding portion, said encoding portion further comprising a plurality of multi-stage shift registers, means and connecting said information source to said plurality of multi-stage shift registers, means to advance said binary coded digital information through corresponding stages of said plurality of shift registers during successive operative cycles, first and second parity bit generators, means for simultaneously sensing the information bits in diagonally adjacent stages of said plurality of multi-stage shift registers and for transferring the signal indication therefrom as inputs to said first parity bit generator, means operative simultaneously with said last-named means for sensing the information bits parallelly adjacent stages of said plurality of multi-stage shift registers and for transferring the signal indications therefrom as inputs to said second parity bit generator, a pair of shift registers each having stages corresponding to those of said plurality of multi-stage shift registers, means connecting the output of said first and second parity generators as inputs to respective ones of said pair or shift registers and for utilizing said means for advancing said binary coded digital information to advance said parity bits in synchronization therewith, a decoding portion, means for effecting the transfer of said binary coded digital information and associated parity bits from said encoder to said decoder, said decoder further comprising a plurality of multi-stage shift registers, means connecting said transferred information and parity bits to said plurality of decoder shift registers, means for advancing said transferred information and parity bits through corresponding stages of said plurality of decoder shift registers during successive operative cycles, an error detection portion including means for simultaneously sensing the digital representation in parallelly adjacent positions of said plurality of decoder shift registers, said error detection portion further including means for simultaneously sensing the information bits in diagonally adjacent stages of said plurality of decoder shift registers, said error detection portion adapted upon detection of an error in said transferred information to initiate the generation of an output signal indicative thereof, bit restoration means positioned between each of said diagonally adjacent stages of said plurality of decoder shift registers and the next succeeding stage thereof, a particular one of said bit restoration means becoming operative upon generation of an output signal indicating the existence of an error in the parallelly related information being sensed by the error detection means associated with that stage of said diagonally adjacent stages of said plurality of decoder shift registers which serves as an input thereto, said bit restoration means being effective when activated in complementing the information bit presently transferred between said particular one of said diagonally adjaecnt stages and said next succeeding stage.

8. In a digital data restoration system capable of detecting and effecting corrections "on-the-fly" to a plurality of information bits of a digital representation wherein said plurality of information bits are selectively related in a parallel and diagonal sense, the combination comprising, a plurality of digital data storage devices, means for transferring data and data monitor bits to said plurality of storage devices and for advancing said digital data through corresponding positions of said plurality of storage devices, error detection means for simultaneously sensing the digital representation in parallelly adjacent positions of said plurality of storage devices, said error detection means further comprising means adapted to sense diagonally adjacent positions of said plurality of storage devices, bit restoration means positioned between each of said diagonally adjacent positions of said plurality of storage devices and the next succeeding position therein, a particular one of said bit restoration means becoming operative upon generation of an output signal indicating the existence of an error in the parallely related digital data being sensed by said error detection means associated therewith, said bit restoration means being effective when activated in complementing the digital data presently being transferred between the associated one of said diagonally adjacent positions and said next succeeding positions therein.

9. In an apparatus for the detection and correction of errors occurring in the transmission of parallel oriented data using a diagonal parity checking technique, which technique is further characterized by its ability to effect said detection and correction of errors in an "on-the-fly" manner, the combination comprising a plurality of data storage means adapted to store information and check bits in corresponding positions therein, error checking means connected to said plurality of data storage means to effect the selective summing of said information and check bits, said error checking means including first means adapted to effect the summing Mod 2 of said information and check bits in parallelly adjacent positions of said plurality of data storage means, said check means including second means adapted to selectively sum the information and check bits located in diagonally adjacent positions of said plurality of data storage means a plurality of bit restoration means operatively connected to said first and second error checking means, a particular one of said plurality of bit restoration means becoming operative upon generation of a signal indicating the existence of an error by both said first and second error checking means, said particular bit restoration means being effective when activated to restore the faulty information bit to its correct value.

10. In an apparatus for the detection and correction of errors occurring in the transmission of a digital representation, said digital representation including information bits and first and second redundancy bits representing selected summings of said information bits, the combination comprising, a plurality of data storage means adaped to store said information bits and said redundancy bits in corresponding positions therein, first error checking means connected to said plurality of data storage means to effect the selected summing of said information bits and said redundancy bits located in parallelly adjacent positions of said plurality of data storage means, second error checking means connected to effect the simultaneous selective summing of the information and redundancy bits located in diagonally adjacent positions of said plurality of data storage means a plurality of bit restoration means, one of said bit restoration means positioned between each of said diagonally adjacent positions of said plurality of data storage means and the next succeeding position therein, said error checking means including means to cause a particular one of said plurality of bit restoration means to become operative upon the occurrence of an error in said digital representation which particular one of said plurality of bit restoration means is effective when activated to restore the digital representation to its correct value.

11. In a digital data restoration system capable of detecting and effecting corrections "on-the-fly" to a plurality of information and redundancy bits of a digital data representation wherein said plurality of information bits are selectively related to said redundancy bits in a parallel and diagonal sense, the combination comprising, a plurality of multi-stage shift registers, means for transferring said digital data to said plurality of decoder shift registers and for advancing said data through corresponding stages of said plurality of shift registers during successive operative cycles, an error detection portion including first checking means for simultaneously sensing the data in parallelly adjacent stages of said plurality of shift registers and for generating a signal indicating the detection of an error in the digital data stored therein, said error detection portion further comprising means adapted to sense the digital data in diagonally adjacent stages of said plurality of shift registers and to transfer a signal indicating the occurrence of an eror in the digital data stored therein, a plurality of bit restoration means, each of said bit restoration means operatively connected to one stage of said diagonally adjacent stages of said plurality of decoder shift registers, means operatively connecting said first and second checking means to said plurality of bit restoration means, said bit restoration means being effective upon the occurrence of an error in said digital data representation to restore said digital representation to its original form, and means operatively connected to each of said plurality of bit restoration means, said last-named means representing the operative status of each of the lower ordered bit restoration means with respect thereto whereby said digital data restoration system is effective in preventing inaccurate corrections in the event of the occurrence of multiple errors therein.

12. A digital data restoration system capable of detecting and effecting corrections "on-the-fly" to a plurality of information and check monitor bits of a digital representation wherein said plurality of information bits are selectively related to said check monitor bits in a parallel and diagonal sense, comprising, a plurality of data storage means adapted to store said information bits, a further pair of storage means adapted to store parallel and diagonal check monitor bits, said parallel check monitor bits having been generated by simultaneously adding Mod 2 all of the information bits presently in parallelly adjacent stages of said plurality of data storage means, said diagonal check monitor bits having been generated by simultaneously adding Mod 2 the information bits presently in diagonally adjacent stages of said plurality of bit storage means, error checking means connected to said plurality of data and check monitor storage means to check through the Mod 2 addition of parallelly adjacent data and check monitor bits the presence or absence of an error in said digital data representation, said error checking means further comprising means for effecting the simultaneous addition Mod 2 of the information and check monitor bits in diagonally adjacent stages of said plurality of data storage means, bit restoration means operatively connected to each of said diagonally adjacent stages of said plurality of storage devices, a particular one of said bit restoration means becoming operative upon generation of a signal indicating the existence of an error in the parallelly related information being sensed by the error checking means associated with that particular stage of said diagonally adjacent stages of said plurality of storage means which serves as an input thereto, said bit restoration means being effective when activated to complement the data bit presently being transferred between said particular one of said diagonally adjacent stages and the next succeeding stage thereof.

13. In a digital data restoration system, the combination comprising an information source, an encoding portion including means for processing said information in parallel and for generating parity bits therefor, a decoding portion comprising a plurality of multi-stage shift registers, means for transferring said information and parity bits to said plurality of decoder shift registers and for advancing said bits through corresponding stages of said plurality of shift registers during successive operative cycles, an error detection portion including first checking means for simultaneously sensing the bits in parallelly adjacent stages of said plurality of decoder shift registers and for generating a signal indicating the occurrence of an error in the information and parity bits stored therein, said error detection portion further comprising second checking means adapted to sense said information and parity bits in diagonally adjacent stages of said plurality of decoder shift registers and to generate a signal indicating the occurrence of an error therein, bit restoration means positioned between each of said diagonally adjacent stages of said plurality of decoder shift registers and the next succeeding state thereof, the particular one of said bit restoration means becoming operative upon the simultaneous generation of signals indicating the existence of an error in the parallelly related information being sensed by the checking means associated with that particular stage of said diagonally adjacent stages of said plurality of decoder shift registers which serves as an input thereto, said particular one of said bit restoration means being effective when activated in complementing the information bit presently being transferred between said particular one of said diagonally adjacent stages and said next succeeding stage.

14. In an apparatus for the detection and correction of errors occurring in the transmission of parallelly oriented data wherein said data includes both information and redundancy bits, the combination comprising, a source of binary coded digital information, an encoding portion, said encoding portion further comprising a plurality of multi-stage storage means, means connecting said information source to said plurality of multi-stage storage means, means to advance said binary coded digital information through corresponding stages of said plurality of multi-stage storage means during successive operative cycles, first and second check bit generators, means for simultaneously sensing the information bits in diagonally adjacent stages of said plurality of multi-stage storage means and for transferring the signal indications therefrom as inputs to said first check bit generator, means operative simultaneously with said last-named means for sensing the information bits in parallelly adjacent stages of said plurality of muti-stage storage means and for transferring the signal indications therefrom as inputs to said second check bit generator, a pair of multi-stage storage elements having stages thereof corresponding to those of said plurality of multi-stage storage means, means connecting the outputs of said first and second check bit generators as inputs to respective ones of said pair of multi-stage storage elements and for utilizing said means for advancing said binary coded digital information to advance said outputs of said first and second check bit generators in synchronization therewith, a decoding portion, means for effecting the transfer of said binary coded digital information and associated check bits from said encoding portion to said decoding portion, said decoding portion further comprising a plurality of digital data storage devices, means for advancing said digital data through corresponding positions of said plurality of storage devices, error detection means for simultaneously sensing the digital representation in parallelly adjacent positions of said plurality of storage devices, said error detection means further comprising means adapted to sense diagonally adjacent positions of said plurality of storage devices, bit restoration means positioned between each of said diagonally adjacent positions of said plurality of storage devices and the next succeeding position therein, a particular one of said bit restoration means becoming operative upon generation of an output signal indicating the existence of an error in the parallelly related digital data being sensed by said error detection means associated therewith, said bit restoration means being effective when activated in complementing the digital data presently being transferred between the associated one of said diagonally adjacent positions and said next succeeding position therein.

References Cited

UNITED STATES PATENTS

| | | | |
|---|---|---|---|
| 2,977,047 | 3/1961 | Bloch | 235—153 |
| 3,075,175 | 1/1963 | Lourie | 340—146.1 |
| 3,142,829 | 7/1964 | Comstock | 340—174.1 |
| 3,183,483 | 5/1965 | Lisowski | 340—146.1 |
| 3,243,774 | 3/1966 | Betz | 340—146.1 |

OTHER REFERENCES

Pomerene, J. H., Register Transfer Check, IBM Technical Disclosure Bulletin, vol. 1, No. 4, December 1958.

MALCOLM A. MORRISON, *Primary Examiner.*

C. E. ATKINSON, *Assistant Examiner.*

UNITED STATES PATENT OFFICE
CERTIFICATE OF CORRECTION

Patent No. 3,387,261 June 4, 1968

Bernard Keith Betz

It is certified that error appears in the above identified patent and that said Letters Patent are hereby corrected as shown below:

Column 14, line 58, "of data error" should read -- of a data error --; line 68, "second error means" should read -- second error detection means --. Column 15, line 56, "diagonal" should read -- diagonally --; line 64, "error" should read -- errors --; line 71, "means and connecting" should read -- means connecting --. Column 16, line 4, "indication" should read -- indications --; line 7, "bits parallelly" should read -- bits in parallelly --; line 12, "output" should read -- outputs --; line 45, "presently transferred" should read -- presently being transferred --. Column 17, lines 15 and 39, "storage means", each occurrence, should read -- storage means, --.

(SEAL)
Attest:

Signed and sealed this 3rd day of March 1970.

Edward M. Fletcher, Jr.
Attesting Officer

WILLIAM E. SCHUYLER, JR.
Commissioner of Patents